US007418737B2

(12) United States Patent
Grupe (10) Patent No.: US 7,418,737 B2
(45) Date of Patent: Aug. 26, 2008

(54) ENCRYPTED DATA FILE TRANSMISSION (75) Inventor: Robert Grupe, Tring (GB)

(73) Assignee: McAfee, Inc., Santa Clara, CA (US)

( * ) Notice: Subject to any disclaimer, the term of this patent is extended or adjusted under 35 U.S.C. 154(b) by 774 days.

(21) Appl. No.: 09/879,056

(22) Filed: Jun. 13, 2001

(65) Prior Publication Data

US 2002/0194470 A1 Dec. 19, 2002

(51) Int. Cl.
*G06F 17/30* (2006.01)
*G06F 7/04* (2006.01)
*H04K 1/00* (2006.01)
*H04L 9/32* (2006.01)
*G06F 7/00* (2006.01)

(52) U.S. Cl. .......................... 726/33; 713/193; 726/26; 726/31; 705/51; 705/57

(58) Field of Classification Search ................. 713/165, 713/182, 202, 193; 380/259, 44, 277; 705/51, 705/57; 726/31, 33, 26
See application file for complete search history.

(56) References Cited

U.S. PATENT DOCUMENTS

| | | | | |
|---|---|---|---|---|
| 5,199,070 A * | 3/1993 | Matsuzaki et al. | ............ | 380/30 |
| 5,321,749 A * | 6/1994 | Virga | ......................... | 380/243 |
| 5,557,678 A * | 9/1996 | Ganesan | ..................... | 380/282 |
| 5,604,801 A * | 2/1997 | Dolan et al. | ................ | 713/159 |
| 5,956,406 A * | 9/1999 | Maldy | ......................... | 380/30 |
| 6,006,328 A * | 12/1999 | Drake | ........................... | 726/23 |
| 6,023,506 A * | 2/2000 | Ote et al. | ..................... | 713/165 |
| 6,052,780 A * | 4/2000 | Glover | ........................ | 713/193 |
| 6,246,771 B1 * | 6/2001 | Stanton et al. | ............. | 380/286 |
| 6,301,660 B1 * | 10/2001 | Benson | ....................... | 713/165 |
| 6,324,569 B1 * | 11/2001 | Ogilvie et al. | ............. | 709/206 |
| 6,625,734 B1 * | 9/2003 | Marvit et al. | ............... | 713/201 |
| 6,785,716 B1 * | 8/2004 | Nobakht | ..................... | 709/219 |
| 6,847,719 B1 * | 1/2005 | Ballard | ....................... | 380/279 |
| 2001/0000265 A1 * | 4/2001 | Schreiber et al. | ............ | 713/201 |
| 2001/0001147 A1 * | 5/2001 | Hutchison et al. | ............. | 705/26 |
| 2002/0016922 A1 * | 2/2002 | Richards et al. | ............. | 713/200 |
| 2002/0078361 A1 * | 6/2002 | Giroux et al. | ............... | 713/183 |
| 2002/0099766 A1 * | 7/2002 | Tuli | ........................... | 709/203 |
| 2002/0121546 A1 * | 9/2002 | Clark | .......................... | 235/383 |
| 2002/0152170 A1 * | 10/2002 | Dutta et al. | .................. | 705/45 |
| 2002/0178353 A1 * | 11/2002 | Graham | ...................... | 713/151 |
| 2003/0028801 A1 * | 2/2003 | Liberman et al. | ........... | 713/200 |
| 2003/0195856 A1 * | 10/2003 | Bramhill et al. | ............... | 705/57 |

OTHER PUBLICATIONS eZip95. "What is eZip Wizard v3.0?", Nov. 2000, <http://www.edisys.com/Support/2626.htm>.*

Gong, Li. Inside Java 2 Platform Security, Architecture, API Design and Implementation, Jun. 1999 Sun Microsystems, pp. 21-25.*

(Continued)

*Primary Examiner*—Michael J Simitoski
(74) *Attorney, Agent, or Firm*—Zilka-Kotab, PC; Christopher J. Hamaty (57) ABSTRACT

A mechanism for encrypting confidential information, uses a transmission package than can be attached to an electronic message. The transmission package is an executable application and controls the decryption, using a separately stored key, and rendering of the contents. On termination of the rendering of the information the transmission package triggers deletion of the encrypted file, the transmission package, and the separately stored key.

28 Claims, 5 Drawing Sheets

OTHER PUBLICATIONS

Menezes, Alfred J. et al. Handbook of Applied Cryptography, 1997 CRC Press LLC, Ch. 13.*

PC-Shareware.com. "How to Unzip ZIP Archive Files", 1997 PC Shareware, Inc., <http://www.pc-shareware.com/pkunzip2.htm>.*

WavPack. "Using WavPack", Feb. 2001, <http://web.archive.org/web/20010205012700/www.wavpack.com/documentation.htm>.*

WinZip. "WinZip Self-Extractor 2.1", Sep. 1999, <http://web.archive.org/web/19990507020557/www.winzip.com/winzipse.htm>.*

Authentica, Inc. Press Release Jan. 16, 2001, "Authentica Delivers MailRecall for Lotus Notes".

Authentica Web Site pages "MailRecall" date not provided.

* cited by examiner

ENCRYPTED DATA FILE TRANSMISSION

BACKGROUND OF THE INVENTION

1. Field of the Invention

This invention relates to the field of data processing systems. More particularly, this invention relates to the field of encrypted data files and their rendering for display or playback.

2. Description of the Prior Art

With the increase in the use of e-mail as a communication mechanism, there has also been a corresponding rise in the need to send messages and data that are confidential. Various encryption techniques have been developed to address this need. Generally, these techniques involve decryption keys which are made available to the recipient at the point of receipt. These keys can be used to decrypt the message once received. This has the result that in transit the message is encrypted and thus, even if intercepted, cannot be read.

There are many encryption techniques available at present for sending someone confidential information. Such techniques often involve the use of decryption keys which can be accessed on production of the correct password. These methods provide a good level of confidentiality for the information in transit, but there are weaknesses in the system after the information has been received.

One problem with existing encryption techniques is that in many cases a decrypted message is stored and thus, even after subsequent deletion, it may be possible to restore the information at some point in the future. A further point is that although current encryption algorithms may be deemed impractical to break at the moment, in five or ten years time decryption may be possible with new computing techniques. The ability to restore the encrypted messages from archive medium may therefore also be a potential problem.

Encryption techniques are known in which the user can specify that a message be read only once. However, this does not protect it from being saved in an unencrypted form or forwarded to other users. ZipLip.com, for example, provides a read-once Web based messaging service, but the contents can be printed, copied to disk and retrieved by administrators from archive media.

SUMMARY OF THE INVENTION

Viewed from one aspect the present invention provides a computer program product comprising a computer program operable to control a first computer to encrypt a computer data file and to create decryption control information for said data file, said computer program comprising:

(i) encryption logic operable to encrypt said data file to create an encrypted file and to create a decryption key for said encrypted file;

(ii) transmission logic operable to control said computer to transmit said decryption key to a remote location;

(iii) application creation logic operable to create an executable application for controlling decryption of and user access to said encrypted file on a second computer, said executable application comprising:

decryption key retrieval logic operable to retrieve a decryption key stored at a remote location and to trigger deletion of said decryption key from said remote location.

The present invention recognises and addresses the above problems of sending encrypted information that is protected in transit, but is at risk from being viewed by people other than the intended recipient once received and decrypted by them.

It does this by storing the decryption key at a remote location and triggering deletion of this key on its retrieval. This ensures that even if a copy of the encrypted information and executable application have been taken prior to user access, they cannot be used to provide access to the decrypted information again once the contents have been accessed, as the decryption key at the remote location will have been destroyed.

In preferred embodiments said executable application further comprises: decryption logic operable to decrypt said encrypted file using said decryption key to create a decrypted file; user access logic operable to provide user access to said decrypted file; deletion logic operable to trigger deletion of said decrypted file, said encrypted file and said executable application on termination of user access to said decrypted file.

The deletion of the encrypted and decrypted information following access, helps reduce the risk of someone retrieving a copy of the decrypted or encrypted information after they have been accessed. This impedes anyone from either viewing the decrypted information or from trying to decode the encrypted information. This latter point is important as decryption of the encrypted information which may at present be extremely difficult if not impossible without the decryption key, may become possible at some time in the future when decryption techniques have advanced. Furthermore, by including the logic for decrypting, providing user access and deleting within the executable application, this logic is deleted along with the encrypted and decrypted information, thereby providing further security.

In some embodiments the executable application comprises retrieval logic operable to retrieve decryption, user access and deletion logic. The logic required to decrypt the decrypted information using the decryption key, to provide user access and then to delete the executable application, decrypted and encrypted information need not be provided within the executable application but can be stored separately, on, for example a separate server. This has the advantage that the executable application need not be so large.

In preferred embodiments said user access logic is operable to provide user access to said decrypted file for a predetermined period of time, said deletion logic being operable to trigger deletion of said decrypted file and said executable application on expiry of said predetermined time period.

To decrease the risk of other parties seeing the message it is preferable to limit the time that the recipient can access the information prior to it being deleted. It should be noted that the deletion logic acts to provide a clean wipe of the information, so that no copy of the information remains.

Advantageously, said user access logic is operable to prevent forwarding, printing and saving (including cutting-and-pasting) of said decrypted file during user access and preferably any input device associated with said computer (such as a keyboard, mouse, microphone etc.) and any output device not involved in the user access are disabled during user access of said decrypted file.

The prevention of the decrypted information being copied, forwarded or saved in any form considerably reduces the risk of a decrypted version of the information being accessed by anyone but the intended recipient.

The computer data file may comprise at least one of a text, application (e.g. spreadsheet), graphics, audio or video data file. Where it comprises text, said encryption logic is preferably operable to convert said computer data file to one or more series of graphic formatted images.

The use of graphic formatted images considerably decreases the chance of the encrypted message being decrypted by someone not having the decryption key. This is because all words of text are converted into a graphics format meaning that anyone trying to break the code cannot use techniques such as looking for commons words in the text.

Although embodiments of the invention can be used to transmit encrypted content in various forms, such as via disks, it is particularly suited for transmitting encrypted files as electronic messages with the executable application attached thereto.

Advantageously, said computer program product further comprises input logic operable to prompt a user for access credentials (such as a pass phrase or biometric profile), an application and encrypted file expiry time, a decryption key expiry time and a user access time period.

Preferably, the encryption logic is operable to include said decryption key expiry time in said decryption key, and to include said encrypted file expiry time and user content access time period in said executable application.

The use of access credentials, such as a pass phrase, or biometric profile, ensures that if the encrypted file were to be intercepted, or even sent to an incorrect person, they would not be able to open the file without this pass phrase or profile. The use of expiry times for the decryption key, and encrypted file means that they are erased after a certain time period. This prevents confidential messages that have not been opened for some reason, from remaining stored somewhere for an unspecified length of time. It also means that if the recipient were to have copied the application and the encrypted message prior to opening it, this copy of the information will be unusable because the decryption key is no longer available. Allowing the user to specify the user access time period and expiry times means that a length of time that is suitable for the size of the file to be viewed and the degree of confidentiality can be chosen by the user.

A further aspect of the present invention provides a computer program product comprising an executable application operable to control a computer to provide user access to an encrypted file, said executable application comprising:

(i) decryption key retrieval logic operable to retrieve a decryption key stored at a remote location and to trigger deletion of said decryption key from said remote location.

In preferred embodiments said decryption key retrieval logic is operable to request input of access credentials, such as a pass phrase or biometric profile, and to compare said access credentials with those stored within said executable application a predetermined number of times, and on one of the input credentials matching the stored ones, to proceed to implement said decryption key retrieval logic. Preferably, the decryption key retrieval logic is operable to trigger deletion of said executable application and said encrypted file if said input pass phrase or biometric profile does not match said stored pass phrase or profile.

The use of access credentials, such as a pass phrase or biometric profile, enables the encrypted information to have a further level of security, so that it is not enough simply to receive the encrypted file and executable application, a person also needs to know the pass phrase or provide the appropriate biometric profile to be able to decrypt the message.

According to a further aspect the present invention provides a computer program product comprising an executable application operable to control a computer to provide user access to an encrypted file, said executable application comprising:

(i) decryption logic operable to decrypt said encrypted file;

(ii) user access logic operable to provide user access to said decrypted file while preventing forwarding, printing or saving of said decrypted file; and (iii) deletion logic operable to trigger deletion of said decrypted file, said encrypted file and said executable application on termination of said user access.

This aspect of the present invention recognises and addresses the above problems of encrypted messages that are protected in transit, but are at risk from being viewed by people other than the intended recipient once received and decrypted by them. It does this by preventing the decrypted file from being forwarded, printed or saved in any form (including cutting and pasting portions of it) and then triggering deletion of the decrypted information, the encrypted information and the user access logic once it has been used. This helps ensure that once it has been decrypted and accessed no copy of either the decrypted file, encrypted file or user access logic remains. This impedes anyone from either accessing the decrypted information or trying to decrypt the encrypted information. This is important as decryption of the encrypted information which may at present be extremely difficult if not impossible without the decryption key, may become possible at some time in the future when decryption techniques have advanced.

Further aspects of the present invention are set out in the appended claims.

The above, and other objects, features and advantages of this invention will be apparent from the following detailed description of illustrative embodiments which is to be read in connection with the accompanying drawings.

BRIEF DESCRIPTION OF THE DRAWINGS

DESCRIPTION OF THE PREFERRED EMBODIMENTS

Figure 1:
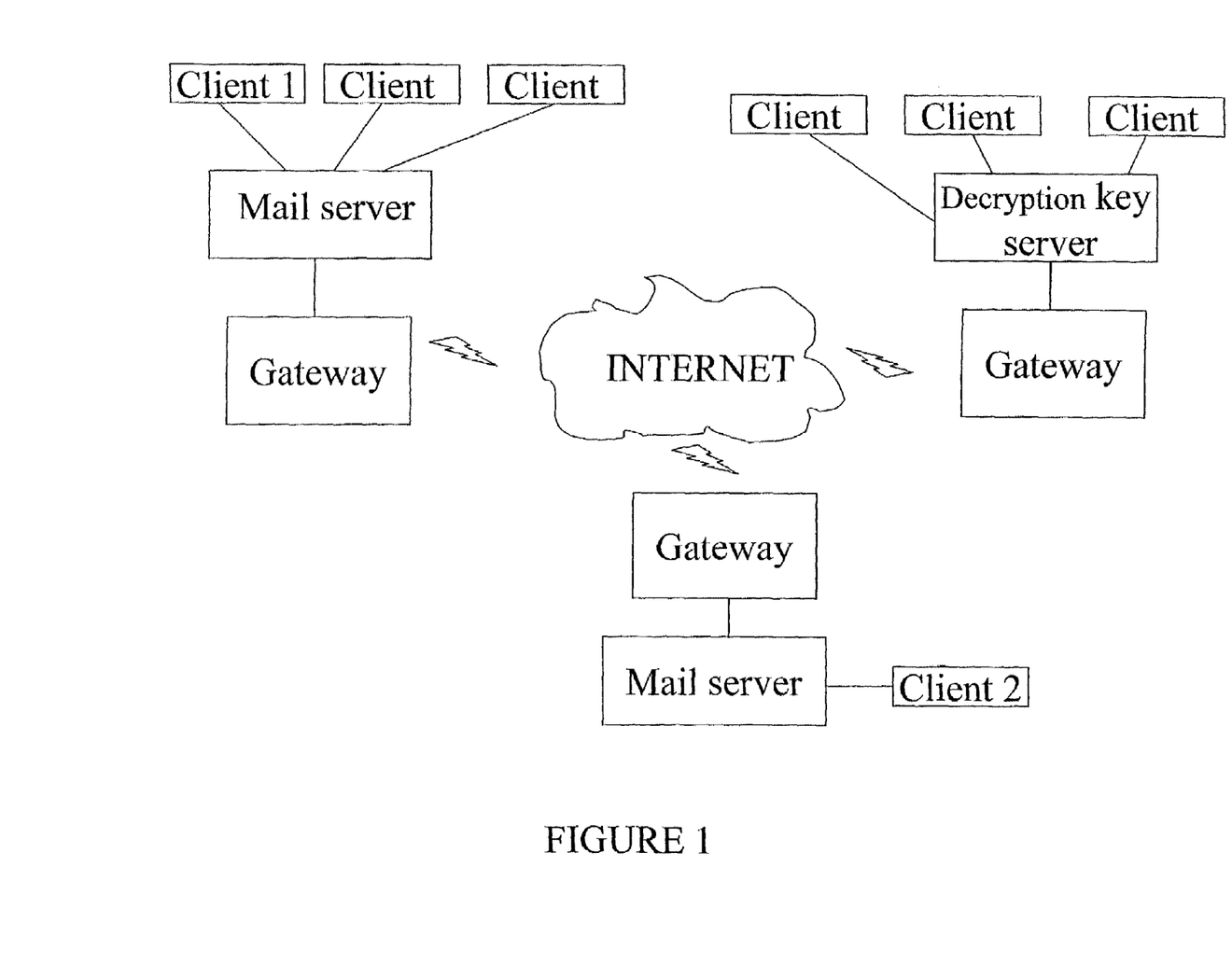
FIG. 1 schematically illustrates a network of computers that may be used to implement an example embodiment of the invention.

With reference to FIG. 1, a network of computers connected via the Internet is illustrated. Client 1's computer comprises a computer program that can be used to encrypt confidential content and to create a decryption key. Furthermore, it includes computer program code for creating a transmission package comprising an executable application which when run may verify the recipient's credentials, by the use, for example, of a pass phrase or biometric profile, and which then controls the display of the information and acts to delete it on termination of the display. This computer program may be in the form of an E-mail plug-in.

The encrypted information along with the executable application are sent via the Internet to client2 computer, where the application is executed and if all is well the information is decrypted.

Figure 2:
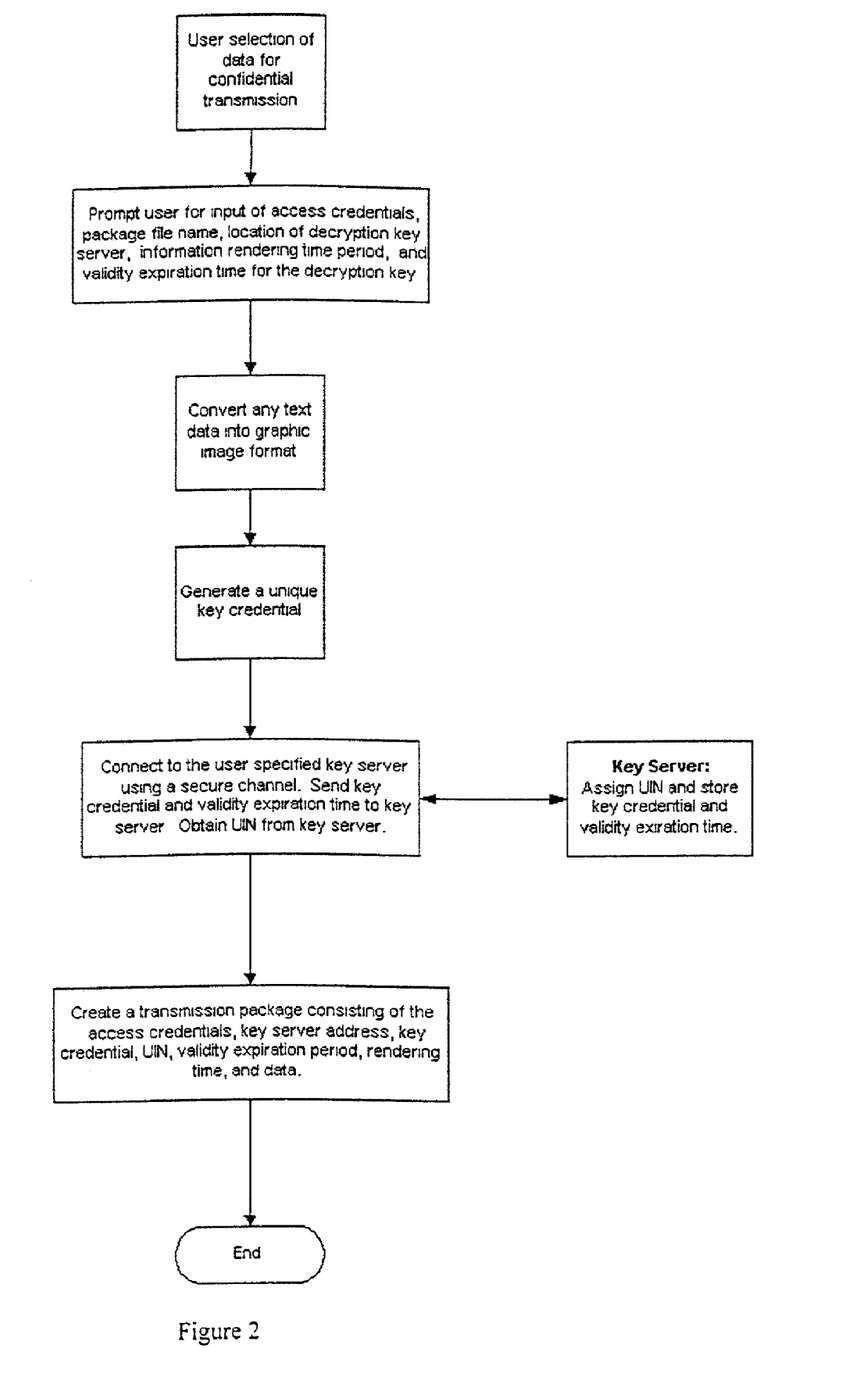
FIG. 2 is a flow diagram illustrating the steps performed when confidential data is prepared for transmission.

FIG. 2 shows a flow diagram illustrating the steps performed when confidential data is prepared for transmission on, for example, a computer such as Client 1 of FIG. 1, which has a confidential e-mail plug-in/program. A user of the Client 1 computer selects a data file containing the text, graphics, audio, or video information that he wishes to send confidentially to Client 2. On indicating that he wishes this information to be communicated confidentially, the Client 1 computer prompts the user for various things. These include access credentials such as a pass phrase or biometric profile. These credentials impede the encrypted information from being decrypted and displayed except on production of the credentials. It therefore adds an extra level of security to the system by ensuring that if the message is sent to the wrong person or is intercepted by someone, that person cannot access the confidential information. The access credentials should therefore be communicated separately to the intended recipient.

The user may also input a file name to be used for the transmission package. Further input includes the location of a server which can be used to store a decryption key. This server is a server that is accessible to both the sender and the recipient and may, for example, be a corporate server within a restricted network if both sender and recipient are within that network, or it may be a public key server on the Internet if sender and recipient are in two different organisations. The user may also input a display or rendering time period, a decryption key and a message expiry time. These time periods may set the time for which the decrypted content is rendered, prior to deletion and the time that the decryption key and encrypted message can stay stored and not accessed on the server and Client 2 computer respectively before they act to trigger their deletion. In some embodiments no inputs are requested, although the computer will generally ask for the entry of access credentails. In other embodiments the inputs are optional and if the user does not input a value, then default values could be used.

If the data is in the form of text, the next step is for the computer to convert this text data into graphic formatted images such as JPEG images. Although this step is not essential it does make it more difficult for anyone to crack any subsequent encryption as the usual decryption techniques of looking for common words are not directly possible. Other data formats such as graphics, audio, or video would be converted to some other form making it more difficult for their content to be directly examined.

Encryption logic on the client1 computer produces a decryption key which enables the encrypted message to be decrypted. The decryption key may also include data operable to trigger deletion of the decryption key when it has been retrieved by the message recipient or on expiry of its expiry time. The Client 1 computer generates a random character string to use as a Unique Sender ID (USI) and passes this to a decryption key server that is specified by the sender, or if no server has been specified, to a default server for that particular user. The server then sends back a Unique Identification Number (UIN) for the package. This is all done using a secure message (via public key encryption or other) or secure session channel (such as SSL). Although the decryption key is generally held on a server it could be held on any remote location that is accessible to the recipient. It could for example be downloaded onto a disk that could then be sent to the recipient separately from the message.

Application creation logic on the Client 1 computer then creates a transmission package comprising an executable application. An input display period along with the Unique Identification Number (UIN), pass phrase and key server address are then encrypted and assigned to this transmission package. The executable application controls the decryption and rendering of the encrypted information. In addition to an indication of the pass phrase or biometric profile, the location of the decryption key, the unique identification number and an expiry time period, the executable application also comprises logic operable to trigger deletion of the decrypted message, encrypted message and itself following display or replay of the decrypted information.

In alternative embodiments the control logic for controlling decryption and rendering of the information along with its deletion already exists and the executable application simply comprises logic operable to retrieve this information from where it is stored, such as on a server. The executable application also comprises an indication of the access credentials, the location of the decryption key, the unique identification number and an expiry time period.

Figure 3:
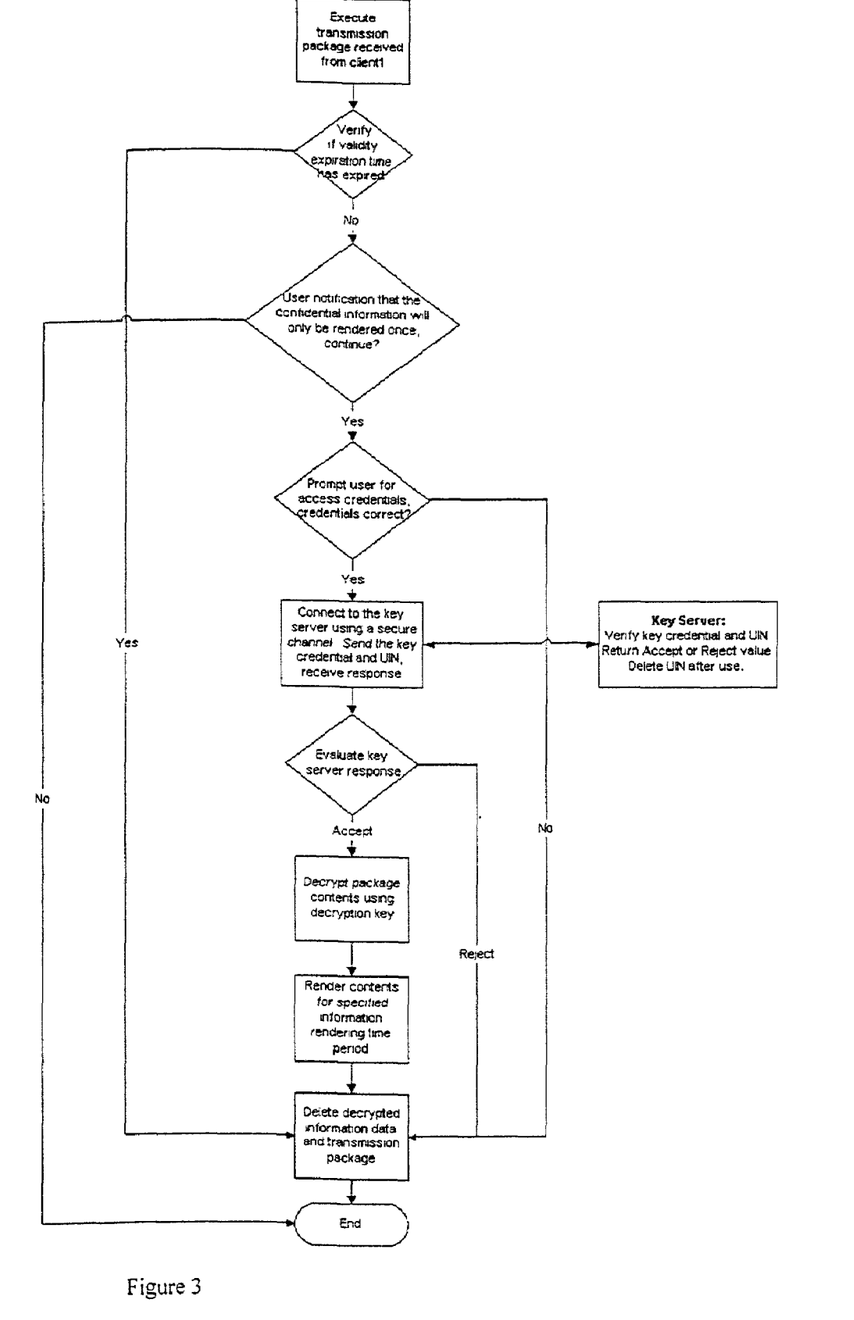
FIG. 3 is a flow diagram illustrating the steps performed on receipt of a confidential information.

FIG. 3 shows a flow diagram illustrating the steps performed on receipt of a confidential transmission package. Firstly the transmission package controls the client 2 computer to verify if the validity expiration time has expired or not. If it has then the decrypted information and transmission package are deleted. If not, then a message is displayed indicating that the confidential information will be rendered only once and asking the recipient if he wants to see it now. If he is not ready to view it, he can opt to look at it later. If he wishes to view it immediately, then he is prompted to provide the appropriate access credentials (i.e. pass phrase, biometric profile, etc.).

If the pass phrase or biometric profile entered correctly matches the credentials in the transmission package then the Client 2 computer establishes a secure dialog (either messages or session) with the key server to check for the existence of the UIN. The session is encrypted so that it can not be intercepted and replayed. If there is a UIN match, then a positive response is returned to the transmission package and the UIN is deleted from the server. If the UIN is not found or the connection times out, then the transmission package self-destructs. In order to avoid potential UIN duplication, the UIN is generally comprised of two or more unique strings one for the message itself and one for the sender. The retrieval triggers the deletion of the decryption key from the server. Thus, if someone has made a copy of the transmission package, subsequent execution of this copy will not find the decryption key. The logic that triggers the deletion of the decryption key may be in the transmission package as part of the retrieval logic or it may be stored with the decryption key itself.

If the recipient credentials entered do not match the stored credentials, then its input can be requested again. If it does not match a certain number of times then in some embodiments the deletion of the transmission package and encrypted message will be triggered.

Following the input of correct credentials, the encrypted message is decrypted using the decryption key and is rendered. The rendering may last for a predetermined time or it may be unlimited. In any case on termination of the rendering, the information and transmission package are deleted.

In preferred embodiments the keyboard and point devices are disabled and the transmission package has no function for saving the contents to disk, printing or forwarding the message. This helps ensure that its confidentiality is maintained.

Figure 4:
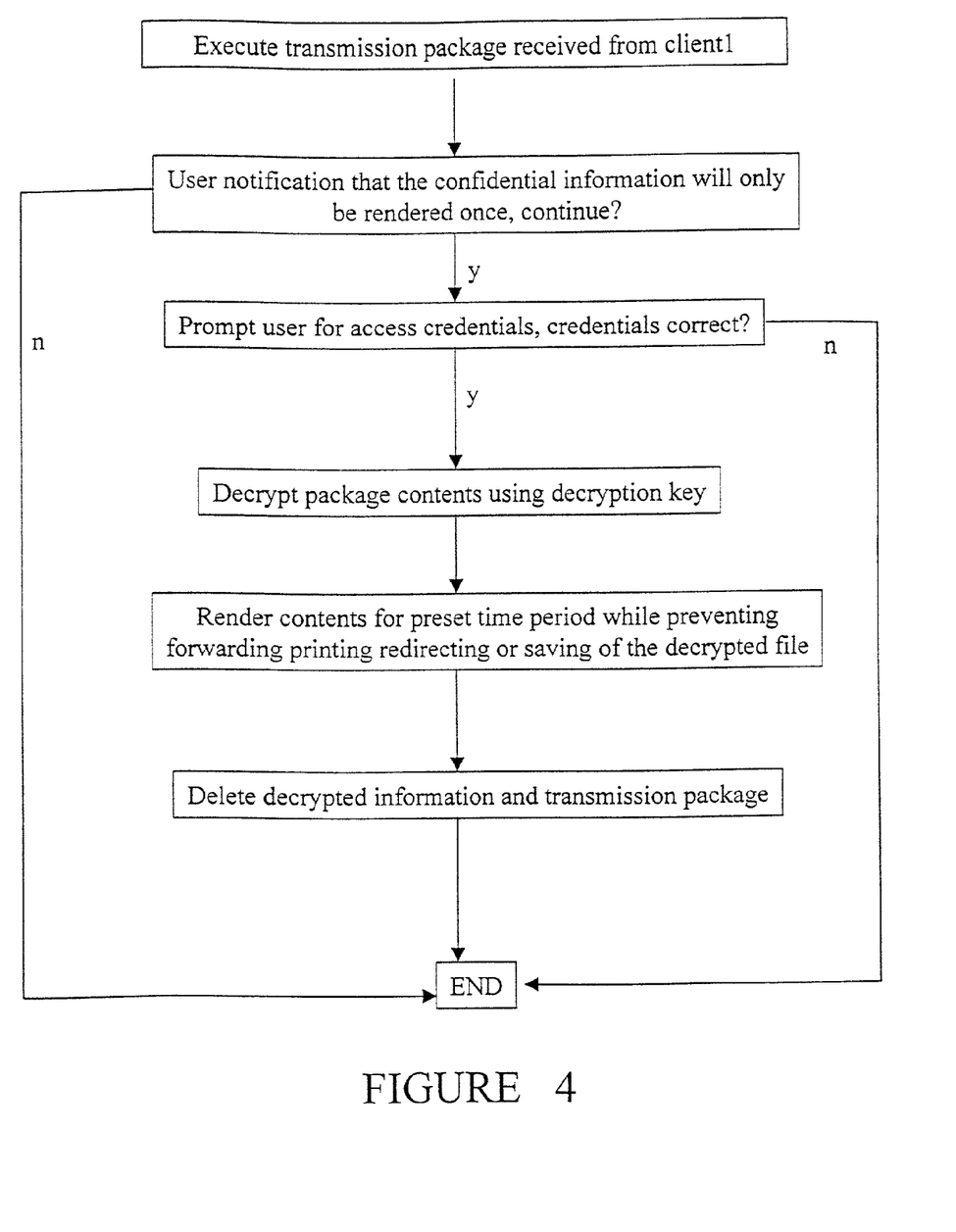
FIG. 4 is a flow diagram illustrating the steps performed when confidential data is prepared for transmission according to an alternative embodiment.

FIG. 4 shows an alternative embodiment of the invention. Here again a sender wishing to send confidential information uses a confidential program. This program is used to encrypt the data and to create a transmission package comprising of an executable application which when run may verify the recipient's credentials, by the use, for example, of a pass phrase, and which then controls the rendering of the information and acts to delete it on termination of the application. It further prevents the message from being copied, forwarded, printed or saved, during rendering.

The recipient executes the transmission package and a message indicating that the confidential information will be rendered only once and asking the recipient if he wants to proceed now is displayed. The user then has the option to continue or try again later when more convenient. If the decision is to continue, then a prompt for recipient credentials is given. The input of a correct credential triggers the computer to decrypt the contents using a decryption key. The decrypted contents are then rendered and any copying, saving, forwarding or redirecting to other output devices is prevented during this time. This is preferably done by disabling input devices (i.e. keyboards, etc.) and not providing the transmission package with any function for saving the contents to disk, printing, copying or forwarding the message. On termination of rendering the information, the information and transmission package are automatically deleted.

Figure 5:
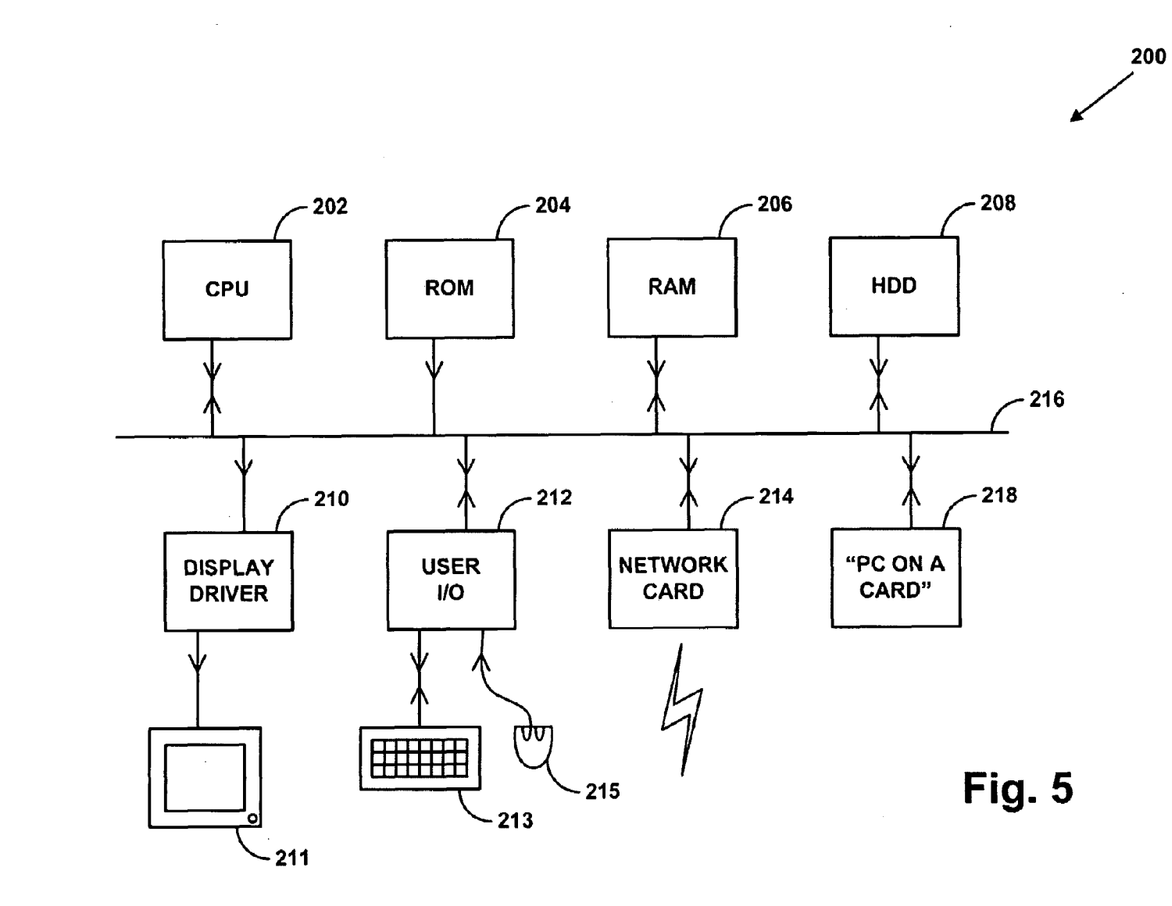
FIG. 5 is a schematic diagram showing a computer that may be used to implement the above embodiments.

FIG. 5 schematically illustrates a general purpose computer 200 of the type that may be used to perform the above described techniques. The general purpose computer 200 includes a central processing unit 202, a read only memory 204, a random access memory 206, a hard disk drive 208, a display driver 210 with attached display 211, a user input/output circuit 212 with attached keyboard 213 and mouse 215, a network card 214 connected to a network connection and a PC computer on a card 218 all connected to a common system bus 216. In operation, the central processing unit 202 executes a computer program that may be stored within the read only memory 204, the random access memory 206, the hard disk drive 208 or downloaded over the network card 214. Results of this processing may be displayed on the display 211 via the display driver 210. User inputs for triggering and controlling the processing are received via the user input/output circuit 212 from the keyboard 213 and mouse 215. The central processing unit 202 may use the random access 206 as its working memory. A computer program may be loaded into the computer 200 via a recording medium such as a floppy disk drive or compact disk. Alternatively, the computer program may be loaded in via the network card 214 from a remote storage drive. The PC on a card 218 may comprise its own essentially independent computer with its own working memory, CPU and other control circuitry that can co-operate with the other elements in FIG. 5 via the system bus 216. The system bus 216 is a comparatively high bandwidth connection allowing rapid and efficient communication.

It will be appreciated that the above computer apparatus is only one example of the computer platforms that may operate in accordance with the present techniques. As examples, handheld computers and interactive televisions may be used. The display driver may also serve to provide audio output and the input devices may include pen based devices, cameras (for automated recognition) and microphones. The hard disk drive may be replaces or supplemented with a floppy disk drive, a CD/DVD drive or memory cards. It will be understood that these are only some examples of the variation in computer platform that may be used as appropriate.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product, embodied on a computer storage medium, comprising a computer program operable to control a first computer to encrypt a computer data file and to create decryption control information for said data file, said computer program comprising:

encryption logic for encrypting said data file to create an encrypted file and for creating a decryption key for said encrypted file, said data file comprising a text file and said encryption logic converting said text file to at least one graphic formatted image prior to encryption;

transmission logic for controlling said computer to transmit said decryption key to a remote location; and application creation logic for creating an executable application for controlling decryption of and user access to said encrypted file on a second computer, said executable application comprising:

retrieval logic for retrieving a decryption key stored at a remote location, triggering deletion of said decryption key from said remote location, and retrieving decryption logic, user access logic and deletion logic, said decryption logic for decrypting said encrypted file using said decryption key to create a decrypted file, said user access logic for providing user access to said decrypted file, and said deletion logic for triggering deletion of said decrypted file, said encrypted file and said executable application on termination of user access to said decrypted file;

wherein output devices not involved in said user access are disabled during said user access to said decrypted file;

wherein input devices are disabled during said user access to said decrypted file;

wherein said user access logic provides said user access to said decrypted file for a predetermined period of time, and said deletion logic deletes said decrypted file, said encrypted file and said executable application on expiry of said predetermined period of time;

wherein said retrieval logic is operable to request input of access credentials and compare said access credentials with credentials stored within said executable application, and, upon said access credentials matching said stored credentials, to proceed to activate said retrieval logic to perform further processing.

2. A computer program product according to claim 1, wherein said user access logic comprises a means for preventing forwarding, printing and saving of said decrypted file during said user access to said decrypted file.

3. A computer program product according to claim 1, wherein said transmission logic comprises a means for controlling said first computer to transmit said encrypted file as at least one of an electronic and opto-electronic message to said second computer with said executable application attached to said at least one of an electronic and opto-electronic message.

4. A computer program product according to claim 1, wherein said encryption logic comprises input logic for prompting a user to input at least one of: said access credentials, an encrypted file expiry time, a decryption key expiry time and a user access time period.

5. A computer program product according to claim 4, wherein said access credentials comprise at least one of a pass phrase and biometric profile.

6. A computer program product according to claim 1, wherein said decryption logic, said user access logic, and said deletion logic are stored on a separate server.

7. A computer program product according to claim 1, wherein said user access to said decrypted file is provided only once.

8. A computer program product according to claim 1, wherein said executable application includes an indication of said predetermined period of time.

9. A computer program product according to claim 1, wherein a transmission package comprising the executable application verifies expiration of said predetermined period of time, deletes said transmission package and said decrypted file if said predetermined period of time has expired, and displays a message if said predetermined period of time has not expired.

10. A computer program product, embodied on a computer storage medium, comprising an executable application operable to control a computer to provide user access to an encrypted file, said executable application comprising:
retrieval logic for retrieving a decryption key stored at a remote location, triggering deletion of said decryption key from said remote location, and retrieving decryption logic, user access logic and deletion logic,
    said decryption logic for decrypting said encrypted file using said decryption key and for generating a decrypted file,
    said user access logic for providing user access to said decrypted file, and
    said deletion logic for triggering deletion of said decrypted file, said encrypted file and said executable application on termination of said user access to said decrypted file;
    wherein said encrypted file comprises a text file converted to at least one graphic formatted image prior to encryption;
    wherein output devices not involved in said user access are disabled during user access to a decrypted file;
    wherein input devices are disabled during said user access to said decrypted file;
    wherein said user access logic provides said user access to said decrypted file for a predetermined period of time, and said deletion logic deletes said decrypted file, said encrypted file and said executable application on expiry of said predetermined period of timex;
    wherein said retrieval logic is operable to request input of access credentials and compare said access credentials with credentials stored within said executable application, and, upon said access credentials matching said stored credentials, to proceed to activate said retrieval logic to perform further processing.

11. A computer program product according to claim 10, wherein said retrieval logic comprises means for triggering deletion of said executable application and said encrypted file if said access credentials do not match said stored credentials.

12. A computer program product according to claim 10, wherein said encrypted file comprises at least one of a received electronic and an opto-electronic message and said executable application is attached to said one of a received electronic and opto-electronic message.

13. A computer program product according to claim 10, wherein said user access logic is operable to prevent forwarding, printing, and saving of said decrypted file during said user access to said decrypted file.

14. A computer-implemented method of encrypting a computer data file and creating decryption control information for said file on a first computer, said method comprising the steps of:
    encrypting said computer data file to create an encrypted file and creating a decryption key for said encrypted file, said computer data file comprising a text file and said step of encrypting includes converting said text file to at least one graphic formatted image prior to encrypting;
    transmitting said decryption key to a remote location;
    creating control logic for controlling a second computer to perform the following method steps:
        retrieving said decryption key stored at said remote location and thereby triggering deletion of said decryption key from said remote location; and
        retrieving decryption, user access and deletion logic for controlling decryption of said encrypted file using said decryption key to produce a decrypted file, provision of user access to said decrypted file and deletion of said decrypted file, said encrypted file and said control logic on termination of said user access to said decrypted file;
    wherein output devices not involved in said user access are disabled during user access to said decrypted file;
    wherein input devices are disabled during said user access to said decrypted file;
    wherein said user access is provided to said decrypted file for a predetermined period of time, and said decrypted file, said encrypted file and said control logic are deleted on expiry of said predetermined period of time;
    wherein said control logic is operable to request input of access credentials and compare said access credentials with credentials stored within said control logic, and, upon said access credentials matching said stored credentials, to proceed to activate said control logic to perform further processing.

15. A method of encrypting a computer data file according to claim 14, wherein forwarding, printing, redirecting output, and saving of said decrypted file is inhibited during said user access to said decrypted file.

16. A method of encrypting a computer data file according to claim 14, wherein said method further comprises the step of transmitting said encrypted file as at least one of an electronic and an opto-electronic message to said second computer with decryption and human readable user access instructions attached to said at least one of an electronic and an opto-electronic message.

17. A method of encrypting a computer data file according to claim 14, wherein said method further comprises the step of prompting a user to input at least one of: said access credentials, encrypted file expiry time, a decryption key expiry time and a user access time period prior to encrypting said computer data file.

18. A method of encrypting a computer data file according to claim 17, wherein said access credentials comprise at least one of a pass phrase and biometric profile.

19. A computer-implemented method of providing user access to an encrypted file on a computer, comprising the step of:
    executing an executable application to:
        retrieve a decryption key stored at a remote location and thereby triggering deletion of said decryption key from said remote location; and
        retrieve decryption, user access and deletion logic operable to control, respectively, decryption of said encrypted file using said decryption key to produce a decrypted file, provision of user access to said decrypted file and deletion of
    said decrypted file, said encrypted file and said executable application
    on termination of said user access to said decrypted file;
    wherein said encrypted file comprises a text file converted to at least one graphic formatted image prior to encryption;
    wherein output devices not involved in said user access are disabled during said user access to said decrypted file;
    wherein input devices are disabled during said user access to said decrypted file;

wherein said user access is provided to said decrypted file for a predetermined period of time, and said decrypted file, said encrypted file and said executable application are deleted on expiry of said predetermined period of time;

wherein said retrieval of said decryption key includes requesting input of access credentials and comparing said access credentials with credentials stored within said executable application, and, upon said access credentials matching said stored credentials, to proceed to activate said retrieval of said decryption key to perform further processing.

20. A method of providing user access to an encrypted file on a computer according to claim 19, wherein if said access credentials does not match said stored credentials said encrypted file is deleted.

21. A method of providing user access to an encrypted file on a computer according to claim 19, wherein said access credentials comprise at least one of a pass phrase and a biometric profile.

22. A method of providing user access to an encrypted file on a computer according to claim 19, wherein said encrypted file comprises at least one of a received electronic and opto-electronic message with decryption and human readable user access instructions attached to said at least one of a received electronic and opto-electronic message.

23. A method of providing user access to an encrypted file on a computer according to claim 19, wherein forwarding, printing, and saving of said decrypted file is inhibited during said user access to said decrypted file.

24. An apparatus for encrypting a computer data file and creating decryption control information for said file, said apparatus comprising:

an encrypting device for encrypting a computer data file and for creating a decryption key for said encrypted file, said computer data file comprising a text file and said encrypting device for converting said text file to at least one formatted image prior to said encrypting;

a transmitter for transmitting said decryption key to a remote location; and an application creator for creating an executable application for controlling decryption of and user access to said encrypted file on a second computer, said application creator creating an executable application comprising:

retrieval logic for retrieving a decryption key stored at a remote location, triggering deletion of said decryption key from said remote location, and retrieving decryption logic, user access logic and deletion logic, said decryption logic for decrypting said encrypted file using said decryption key, said user access logic for providing user access to said decrypted file, and said deletion logic for triggering deletion of said decrypted file, said encrypted file and said executable application on termination of the access to said decrypted file;

wherein output devices not involved in said user access are disabled during said user access to said decrypted file;

wherein input devices are disabled during said user access to said decrypted file;

wherein said user access logic provides said user access to said decrypted file for a predetermined period of time, and said deletion logic triggers deletion of said decrypted file, said encrypted file and said executable application on expiry of said predetermined period of time, wherein said retrieval logic is operable to request input of access credentials and compare said access credentials with credentials stored within said executable application, and, upon said access credentials matching said stored credentials, to proceed to activate said retrieval logic to perform further processing.

25. An apparatus for encrypting a computer data file according to claim 24, wherein said user access logic comprises means for preventing forwarding, printing and saving of said decrypted file during said user access to said decrypted file.

26. An apparatus for encrypting a computer data file according to claim 24, wherein said transmitter comprises means for controlling said first computer to transmit said encrypted file as one of an electronic and opto-electronic message to said second computer with said executable application attached to said at least one of an electronic and opto-electronic message.

27. An apparatus for encrypting a computer data file according to claim 24, wherein said encrypting device comprises means for prompting a user to input at least one of: said access credentials, encrypted file expiry time, a decryption key expiry time and a user access time period.

28. An apparatus for encrypting a computer data file according to claim 27, wherein said access credentials comprise at least one of a pass phrase and a biometric profile.

* * * * *